(12) United States Patent
Kuo et al.

(10) Patent No.: US 9,733,457 B2
(45) Date of Patent: Aug. 15, 2017

(54) ZOOM LENS

(71) Applicant: Coretronic Corporation, Hsin-Chu (TW)

(72) Inventors: Tao-Hung Kuo, Hsin-Chu (TW); Hsin-Wen Tsai, Hsin-Chu (TW); Ching-Chuan Wei, Hsin-Chu (TW); Chuan-Te Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 14/940,156

(22) Filed: Nov. 13, 2015

(65) Prior Publication Data

US 2016/0202456 A1 Jul. 14, 2016

(30) Foreign Application Priority Data

Jan. 12, 2015 (TW) .............................. 104100954 A

(51) Int. Cl.
*G02B 15/14* (2006.01)
*G02B 15/177* (2006.01)
*G02B 15/16* (2006.01)
*G02B 13/16* (2006.01)

(52) U.S. Cl.
CPC ......... *G02B 15/177* (2013.01); *G02B 15/161* (2013.01); *G02B 13/16* (2013.01)

(58) Field of Classification Search
CPC .................................................. G02B 15/177
USPC ................................................ 359/691, 717
See application file for complete search history.

(56) References Cited

U.S. PATENT DOCUMENTS

| 4,364,641 | A | 12/1982 | Mogami |
| 7,400,455 | B2 | 7/2008 | Sawamoto |
| 8,000,023 | B2 | 8/2011 | Chou et al. |
| 2011/0157710 | A1* | 6/2011 | Chou .................. G02B 15/177 359/664 |
| 2012/0050602 | A1 | 3/2012 | Imaoka et al. |
| 2014/0029119 | A1* | 1/2014 | Chou .................... G02B 13/18 359/717 |

FOREIGN PATENT DOCUMENTS

TW 201135279 10/2011

* cited by examiner

*Primary Examiner* — James Jones
(74) *Attorney, Agent, or Firm* — Jianq Chyun IP Office

(57) ABSTRACT

A zoom lens includes a first lens group and a second lens group. The first lens group has a negative refractive power and includes a first lens, a second lens, and a third lens arranged in sequence from a magnified side to a minified side, refractive powers of which are negative, negative, and positive, respectively. The second lens group has a positive refractive power and is disposed between the first lens group and the minified side. The second lens group includes a fourth lens, a fifth lens, a sixth lens, a seventh lens, an eighth lens, a ninth lens, and a tenth lens arranged in sequence from the magnified side to the minified side, refractive powers of which are positive, negative, positive, negative, positive, negative, and positive, respectively. The first lens and the tenth lens are aspheric lenses, and the second lens to the ninth lens are spherical lenses.

12 Claims, 10 Drawing Sheets

ZOOM LENS

CROSS-REFERENCE TO RELATED APPLICATION

This application claims the priority benefit of Taiwan application serial no. 104100954, filed on Jan. 12, 2015. The entirety of the above-mentioned patent application is hereby incorporated by reference herein and made a part of this specification.

FIELD OF THE INVENTION

The invention relates to a lens. More particularly, the invention relates to a zoom lens.

DESCRIPTION OF RELATED ART

At present, lenses (e.g., projection lenses) are prone to have a high zoom ratio and be miniaturized. Due to market competition, manufacturers are endeavored to design and make the lenses with proper structures and reduced the weight and the volume of the lenses by keeping the zooming function of the projection lenses. In order to perform the zooming function, the simplest projection lens on the market would be equipped with two lens groups.

U.S. Pat. No. 7,400,455 discloses a zoom projection lens with two lens groups. U.S. Pat. No. 8,000,023 discloses a zoom lens applicable to a projector, and the disclosed zoom lens includes a first lens group having a negative refractive power and a second lens group having a positive refractive power, and the first lens group and second lens group are arranged in sequence from a magnified side to a minified side. Taiwan Patent Publication no. 201135279 discloses a zoom projection lens that includes a first lens group having a negative refractive power and a second lens group having a positive refractive power, and the first lens group and second lens group are arranged in sequence from a magnified side to a minified side. Here, the first lens group includes a first lens, a second lens, and a third lens, and refractive powers of the first lens, the second lens, and the third lens are negative, negative, and positive, respectively. U.S. Patent Publication no. 2012/0050602 discloses a zoom lens system that is constituted by 10 lenses and includes a first lens unit, a second lens unit, a third lens unit, a fourth lens unit, and a fifth lens unit.

The information disclosed in this "BACKGROUND" section is only for enhancement of understanding of the background of the described technology and therefore it may contain information that does not form the prior art that is already known to a person of ordinary skill in the art. Further, the information disclosed in this "BACKGROUND" section does not mean that one or more problems to be solved by one or more embodiments of the invention was acknowledged by a person of ordinary skill in the art.

SUMMARY OF THE INVENTION

The invention is directed to a zoom lens characterized by low manufacturing costs and favorable optical quality.

Other objectives and advantages of the invention can be further illustrated by the technical features broadly embodied and described as follows.

To achieve one, a part, or all of the above advantages or other advantages, an embodiment of the invention provides a zoom lens, and the zoom lens includes a first lens group and a second lens group. The first lens group has a negative refractive power and includes a first lens, a second lens, and a third lens arranged in sequence from a magnified side to a minified side, and refractive powers of the first lens, the second lens, and the third lens are respectively negative, negative, and positive. The second lens group has a positive refractive power and is disposed between the first lens group and the minified side. The second lens group includes a fourth lens, a fifth lens, a sixth lens, a seventh lens, an eighth lens, a ninth lens, and a tenth lens arranged in sequence from the magnified side to the minified side, refractive powers of the fourth lens, the fifth lens, the sixth lens, the seventh lens, the eighth lens, the ninth lens, and the tenth lens are respectively positive, negative, positive, negative, positive, negative, and positive. The first lens and the tenth lens are aspheric lenses, and the second lens to the ninth lens are spherical lenses.

According to an embodiment of the invention, the zoom lens satisfies $5.1 < dw/dt < 5.8$, dw represents a distance between the first lens group and the second lens group when the zoom lens is located at a wide-angle end, and dt represents a distance between the first lens group and the second lens group when the zoom lens is located at a telephoto end.

According to an embodiment of the invention, the zoom lens satisfies $0.8 < |f2/f1| < 1$, f1 represents an effective focal length of the first lens group, and f2 represents an effective focal length of the second lens group.

According to an embodiment of the invention, the second lens group further includes an aperture stop disposed between the ninth lens and the tenth lens.

According to an embodiment of the invention, the first lens is a convex-concave lens with a convex surface facing the magnified side, the second lens is a biconcave lens, and the third lens is a concave-convex lens with a convex surface facing the magnified side.

According to an embodiment of the invention, the fourth lens is a biconvex lens, the fifth lens is a convex-concave lens with a convex surface facing the minified side, the sixth lens is a concave-convex lens with a convex surface facing the magnified side, the seventh lens is a convex-concave lens with a convex surface facing the magnified side, the eighth lens is a biconvex lens, the ninth lens is a biconcave lens, and the tenth lens is a concave-convex lens with a convex surface facing the minified side.

According to an embodiment of the invention, the fourth lens and the fifth lens form a double cemented lens.

According to an embodiment of the invention, the seventh lens, the eighth lens, and the ninth lens form a triple cemented lens.

According to an embodiment of the invention, the second lens group is a zooming group, and the first lens group is a focusing group.

According to an embodiment of the invention, when the zoom lens is zoomed, the first lens group is moved with movement of the second lens group to achieve true zoom.

According to an embodiment of the invention, the zoom lens satisfies $0.226 < D1/TT < 0.256$, D1 represents a diameter of a clear aperture of the first lens, and TT represents a total track of the zoom lens.

According to an embodiment of the invention, the zoom lens satisfies $0.237 < D10/D1 < 0.258$, D1 represents a diameter of a clear aperture of the first lens, and D10 represents a diameter of a clear aperture of the tenth lens.

In view of the above, the zoom lens provided in the embodiments of the invention may achieve at least one of advantages or effects as listed below. In the zoom lens of the embodiments of the invention, the refractive powers of the first lens, the second lens, and the third lens are sequentially negative, negative, and positive, respectively; the refractive powers of the fourth lens, the fifth lens, the sixth lens, the seventh lens, the eighth lens, the ninth lens, and the tenth lens are sequentially positive, negative, positive, negative, positive, negative, and positive, respectively; the first lens and the tenth lens are aspheric lenses, and the second lens to the ninth lens are spherical lenses. As a result, the zoom lens characterized by low manufacturing costs and the simple structure is able to achieve favorable optical imaging quality.

Other features and advantages of the invention will be further understood from the further technological features disclosed by the embodiments of the invention wherein there are shown and described embodiments of this invention, simply by way of illustration of modes suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting.

On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
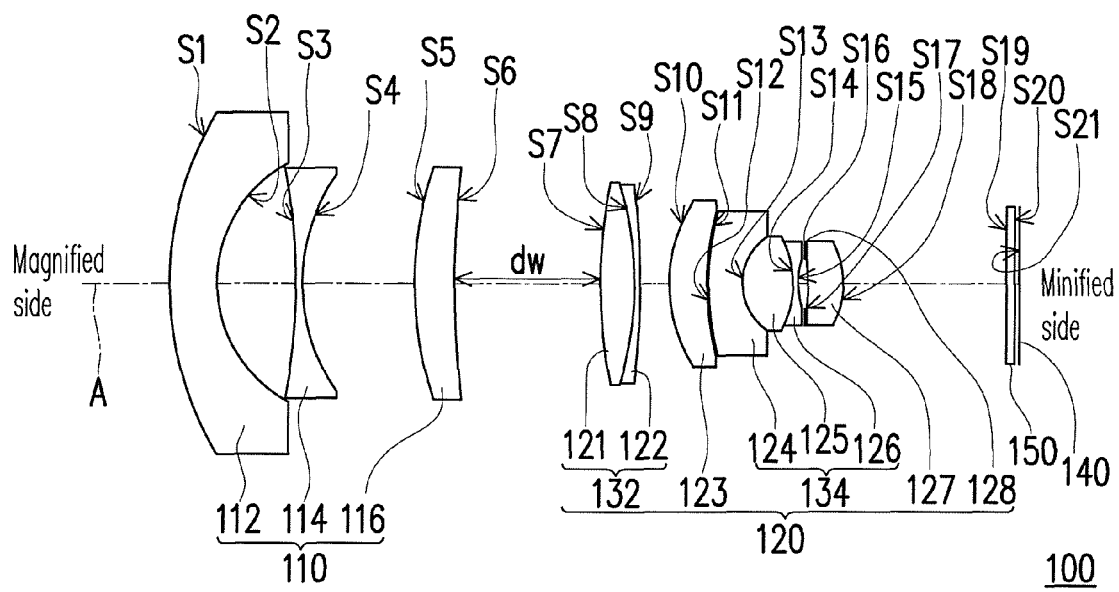
FIG. 1A is a schematic cross-sectional diagram illustrating a zoom lens located at a wide-angle end according to an embodiment of the invention.
Figure 1B:
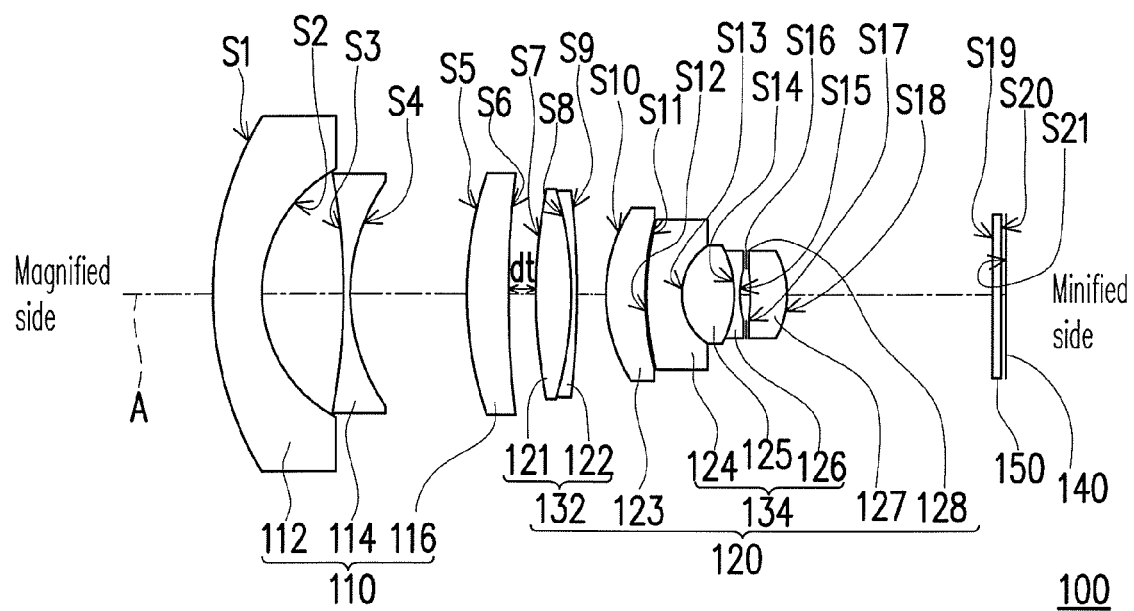
FIG. 1B is a schematic cross-sectional diagram illustrating the zoom lens depicted in FIG. 1A and located at a telephoto end.

FIG. 1A is a schematic cross-sectional diagram illustrating a zoom lens located at a wide-angle end according to an embodiment of the invention. FIG. 1B is a schematic cross-sectional diagram illustrating the zoom lens depicted in FIG. 1A and located at a telephoto end. With reference to FIG. 1A and FIG. 1B, the zoom lens 100 provided in the embodiment includes a first lens group 110 and a second lens group 120, both of the first lens group 110 and the second lens group 120 are arranged on an optical axis A of the zoom lens 100. The first lens group 110 has a negative refractive power and includes a first lens 112, a second lens 114, and a third lens 116 arranged in sequence from a magnified side to a minified side, and refractive powers of the first lens 112, the second lens 114, and the third lens 116 are negative, negative, and positive, respectively. In the embodiment, the zoom lens 100 is a projection lens applicable to a projector, for instance, the magnified side is a screen end, and the minified side is an image source end (an end at the image source 140). According to the embodiment, the image source 140 is a light valve, e.g., a digital micro-mirror device (DMD), a liquid-crystal-on-silicon (LCOS) panel, a transmissive liquid crystal panel, or any other spatial light modulator (SLM).

The second lens group 120 has a positive refractive power and is disposed between the first lens group 110 and the minified side. The second lens group 120 includes a fourth lens 121, a fifth lens 122, a sixth lens 123, a seventh lens 124, an eighth lens 125, a ninth lens 126, and a tenth lens 127 arranged in sequence from the magnified side to the minified side, and refractive powers of the fourth lens 121, the fifth lens 122, the sixth lens 123, the seventh lens 124, the eighth lens 125, the ninth lens 126, and the tenth lens 127 are positive, negative, positive, negative, positive, negative, and positive, respectively. Besides, the first lens 112 and the tenth lens 127 are aspheric lenses, and the second lens to the ninth lens (i.e., 114, 116, 121, 122, 123, 124, 125, and 126) are spherical lenses.

In the zoom lens 100 provided of the embodiment, the refractive powers of the first lens 112, the second lens 114, and the third lens 116 are sequentially negative, negative, and positive, respectively; the refractive powers of the fourth lens 121, the fifth lens 122, the sixth lens 123, the seventh lens 124, the eighth lens 125, the ninth lens 126, and the tenth lens 127 are sequentially positive, negative, positive, negative, positive, negative, and positive, respectively; the first lens 112 and the tenth lens 127 are aspheric lenses, and the other lenses are spherical lenses. As a result, according to the embodiment, the zoom lens 100 characterized by low manufacturing costs and the simple structure may still achieve favorable/well optical imaging quality.

According to an embodiment, the second lens group 120 is a zooming group, and the first lens group 110 is a focusing group. Besides, in the embodiment, when the zoom lens 100 is zoomed, the first lens group 110 is moved with the movement of the second lens group 120 to achieve true zoom. To be more specific, when the distance between the screen (not shown) at the magnified side and the image source 140 at the minified side is changed, in order to clearly project the image from the image source 140 to the screen by the zoom lens 100, the first lens group 110 may be moved relative to the image source 140, so as to achieve the effects of focusing. On the other hand, when the distance between the screen and the image source 140 remains unchanged, the second lens group 120 may be moved relative to the image source 140, so as to change the size of the projected image, i.e., accomplish the effects of zooming. While the second lens group 120 is moved, the first lens group 110 is also moved in a compensative manner, so as to ensure the image on the screen to stay clear during the zooming process. That is, while the second lens group 120 is moved, the compensative movement of the first lens group 110 may allow/ensure the image to be continuously focused on the screen at every moment during the zooming process, which is so-called "true zoom".

According to the embodiment, the second lens group 120 further includes an aperture stop 128 disposed between the ninth lens 126 and the tenth lens 127. In the embodiment, the first lens 112 is a convex-concave lens with a convex surface facing the magnified side, the second lens 114 is a biconcave lens, and the third lens 116 is a concave-convex lens with a convex surface facing the magnified side. Besides, in the embodiment, the fourth lens 121 is a biconvex lens, the fifth lens 122 is a convex-concave lens with a convex surface facing the minified side, the sixth lens 123 is a concave-convex lens with a convex surface facing the magnified side, the seventh lens 124 is a convex-concave lens with a convex surface facing the magnified side, the eighth lens 125 is a biconvex lens, the ninth lens 126 is a biconcave lens, and the tenth lens 127 is a concave-convex lens with a convex surface facing the minified side. In the embodiment, the fourth lens 121 and the fifth lens 122 form a double cemented lens 132, and the seventh lens 124, the eighth lens 125, and the ninth lens 126 form a triple cemented lens 134.

The zoom lens 100 described in the embodiment satisfies 5.1<dw/dt<5.8, where dw represents a distance between the first lens group 110 and the second lens group 120 (i.e., the distance dw on the optical axis A of the zoom lens 100, as shown in FIG. 1A) when the zoom lens 100 is located at a wide-angle end (e.g., as shown in FIG. 1A), and dt represents a distance between the first lens group 110 and the second lens group 120 (i.e., the distance dt on the optical axis A of the zoom lens 100, as shown in FIG. 1B) when the zoom lens 100 is located at a telephoto end (e.g., as shown in FIG. 1B). In the embodiment, the zooming ratio of the zoom lens 100 may reach 1.4 times; hence, if dw/dt≤5.1, the zoom lens 100 would not have the high zooming ratio. On the contrary, if dw/dt≥5.8, the total track of the zoom lens 100 would be overly long, and the diameter(s) of the clear aperture of the lens(es) in the first lens group 110 would be increased accordingly. As a result, the zoom lens 100 of the embodiment satisfies 5.1<dw/dt<5.8, such that the zooming ratio of the zoom lens 100 may be high, the total track of the zoom lens 100 may be short, and the diameter of the clear aperture of each lens in the first lens group 110 may be small.

According to the embodiment, the zoom lens 100 may satisfy 0.8<|f2/f1|<1, f1 represents an effective focal length (EFL) of the first lens group 110, and f2 represents an EFL of the second lens group 120. If |f2/f1|≥1, then the negative refractive power of the first lens group 110 is excessive, and spherical aberration and coma would not be effectively corrected. By contrast, if |f2/f1|≤0.8, then the negative refractive power of the first lens group 110 is insufficient, and the resolution would not be effectively corrected. In the embodiment, the zoom lens 100 satisfies 0.8<|f2/f1|<1, the spherical aberration, the coma, and the resolution may all be effectively corrected.

According to an embodiment, the zoom lens 100 satisfies 0.226<D1/TT<0.256, D1 represents the diameter of the clear aperture of the first lens 112, and TT represents a total track of the zoom lens 100 (i.e., the distance from a surface S1 of the first lens 112 to a surface S18 of the tenth lens 127). If D1/TT≤0.226, light surrounding the zoom lens 100 is excessively removed, such that edges of the image become darker. On the other hand, if D1/TT≥0.256, the relatively large size of the first lens 112 leads to the difficulty in reducing the volume of the zoom lens 100. In the embodiment, the fact that the zoom lens 100 satisfies 0.226<D1/TT<0.256 may ensure/allow the uniform brightness of the image and the proper size (e.g. small enough) of the first lens 112.

According to the embodiment, the zoom lens 100 satisfies 0.237<D10/D1<0.258, D1 represents the diameter of the clear aperture of the first lens 112, and D10 represents the diameter of the clear aperture of the tenth lens 127. If D10/D1≤0.237, light surrounding the zoom lens 100 is excessively removed, such that edges of the projected image on the screen become darker. On the other hand, if D10/D1≥0.258, the relatively large size of the tenth lens 127 leads to the difficulty in reducing the volume of the zoom lens 100. In the embodiment, the fact that the zoom lens 100 satisfies 0.237<D10/D1<0.258 may allow/ensure the zoom lens 100 to provide the image with the uniform brightness in the circumstance of the zoom lens 100 with small size.

An embodiment of the zoom lens 100 is given hereinafter. However, the invention is not limited to the data listed in Table 1 and Table 2. People having ordinary skill in the pertinent art should be aware that various modifications and variations may be properly made to the parameters or the settings provided herein without departing from the scope or spirit of the invention after referring to the invention.

TABLE 1

| Surface | Curvature Radius (mm) | Distance (mm) | Refractive index | Abbe number | Notes |
|---|---|---|---|---|---|
| S1 | 72.7 | 7.3 | 1.514 | 57.1 | first lens |
| S2 | 20.9 | 12.2 | air | | |
| S3 | −101.3 | 1 | 1.501 | 80.17 | second lens |
| S4 | 27.5 | 15.8 | air | | |
| S5 | 47.8 | 8 | 1.701 | 41.23 | third lens |
| S6 | 107.1 | d3(variable) | air | | |
| S7 | 72.8 | 5 | 1.638 | 58.25 | fourth lens |
| S8 | −55.2 | 1 | 1.734 | 27.34 | fifth lens |
| S9 | −162.9 | 0.1 | air | | |
| S10 | 22.4 | 5.9 | 1.821 | 24.41 | sixth lens |
| S11 | 48.8 | 0.1 | air | | |
| S12 | 38.8 | 5.2 | 1.653 | 33.05 | seventh lens |

TABLE 1-continued

| Surface | Curvature Radius (mm) | Distance (mm) | Refractive index | Abbe number | Notes |
|---|---|---|---|---|---|
| S13 | 8.5 | 7.5 | 1.510 | 77.91 | eighth lens |
| S14 | −16 | 1 | 1.669 | 33.49 | ninth lens |
| S15 | 32.9 | 0.5 | air | | |
| S16 | infinite | 0.7 | air | | aperture stop |
| S17 | −41.6 | 5.3 | 1.564 | 41.63 | tenth lens |
| S18 | −12.7 | d10(variable) | air | | |
| S19 | infinite | 1 | 1.509 | 60.96 | cover glass |
| S20 | infinite | 0.7 | air | | |
| S21 | infinite | 0 | air | | image source |

In Table 1, the distance refers to a linear distance along the optical axis A between two neighboring surfaces. For instance, the distance of the surface S1 is the linear distance along the optical axis A between the surface S1 and the surface S2. The thickness, the index of refraction, and Abbe number of each of the lenses listed in the "Notes" column have the corresponding values provided in each row. Besides, in Table 1, the surfaces S1 and S2 are two opposite surfaces of the first lens 112, the surface S1 faces the magnified side, and the surface S2 faces the minified side. The surfaces S3 and S4 are two opposite surfaces of the second lens 114, the surface S3 faces the magnified side, and the surface S4 faces the minified side. The surfaces S5 and S6 are two opposite surfaces of the third lens 116, the surface S5 faces the magnified side, and the surface S6 faces the minified side. The surface S7 is a surface of the fourth lens 121 facing the magnified side, the surface S8 is a surface connecting the fourth lens 121 and the fifth lens 122, and the surface S9 is a surface of the fifth lens 122 facing the minified side. The surfaces S10 and S11 are two opposite surfaces of the sixth lens 123, the surface S10 faces the magnified side, and the surface S11 faces the minified side. The surface S12 is a surface of the seventh lens 124 facing the magnified side, the surface S13 is a surface connecting the seventh lens 124 and the eighth lens 125, the surface S14 is a surface connecting the eighth lens 125 and the ninth lens 126, and the surface S15 is a surface of the ninth lens 126 facing the minified side. The surface S16 is the aperture stop 128. The surfaces S17 and S18 are two opposite surfaces of the tenth lens 127, the surface S17 faces the magnified side, and the surface S18 faces the minified side. The surfaces S19 and S20 are two opposite surfaces of the cover glass 150, the surface S21 is an active surface of the image source 140, and the cover glass 150 serves to protect the active surface of the image source 140. In addition, d3 is the linear distance along the optical axis A of the zoom lens 100 between the first lens group 110 and the second lens group 120, d10 is the linear distance along the optical axis A of the zoom lens 100 between the tenth lens 127 of the second lens group 120 and the cover glass 150, and d3 and d10 are variables that may be adjusted with the zooming action and the focusing action.

The surfaces S1, S2, S17, and S18 are aspheric surfaces with even power and may be expressed by the following formula:

$$Z = \frac{cr^2}{1+\sqrt{1-(1+k)c^2r^2}} + A_2r^2 + A_4r^4 + A_6r^6 + A_8r^8 + A_{10}r^{10} + A_{12}r^{12} + A_{14}r^{14} + \ldots$$

In the formula, Z is a sag in the direction of the optical axis A, and c is the inverse of the radius of an osculating sphere, i.e. the inverse of the curvature radius (e.g., the curvature radii of the surfaces S1, S2, S17, and S18 in Table 1) close to the optical axis A. k is the second-order conic constant, r is the height of the aspheric surface, where the height is defined as the distance from the center of the lens to the edge of the lens. $A_2, A_4, A_6, A_8, A_{10}, A_{12}, A_{14} \ldots$ are aspheric coefficients, the coefficient $A_2$ is zero according to the embodiment, and the coefficient $A_{12}$ and the coefficients corresponding to higher orders (higher than $A_{12}$) are all zero. Aspheric parameters of the surfaces S1, S2, S17, and S18 are listed in Table 2.

TABLE 2

| Aspheric parameters | Second-order conic constant k | Coefficient $A_4$ | Coefficient $A_6$ | Coefficient $A_8$ |
|---|---|---|---|---|
| S1 | 0 | 9.00E−06 | −5.58E−09 | −3.94E−13 |
| S2 | 0 | 9.50E−06 | 5.08E−09 | −7.55E−12 |
| S17 | 0 | −2.E−04 | −1.27E−06 | 6.35E−09 |
| S18 | 0 | −5.09E−05 | −6.72E−07 | 2.59E−09 |

| Aspheric parameters | Coefficient $A_{10}$ |
|---|---|
| S1 | 2.76E−15 |
| S2 | −1.06E−13 |
| S17 | −5.82E−10 |
| S18 | −1.83E−10 |

Here, "2.76E−15" refers to $2.76 \times 10^{-15}$, and the others may be deduced by analogy therefrom.

Figure 2A:
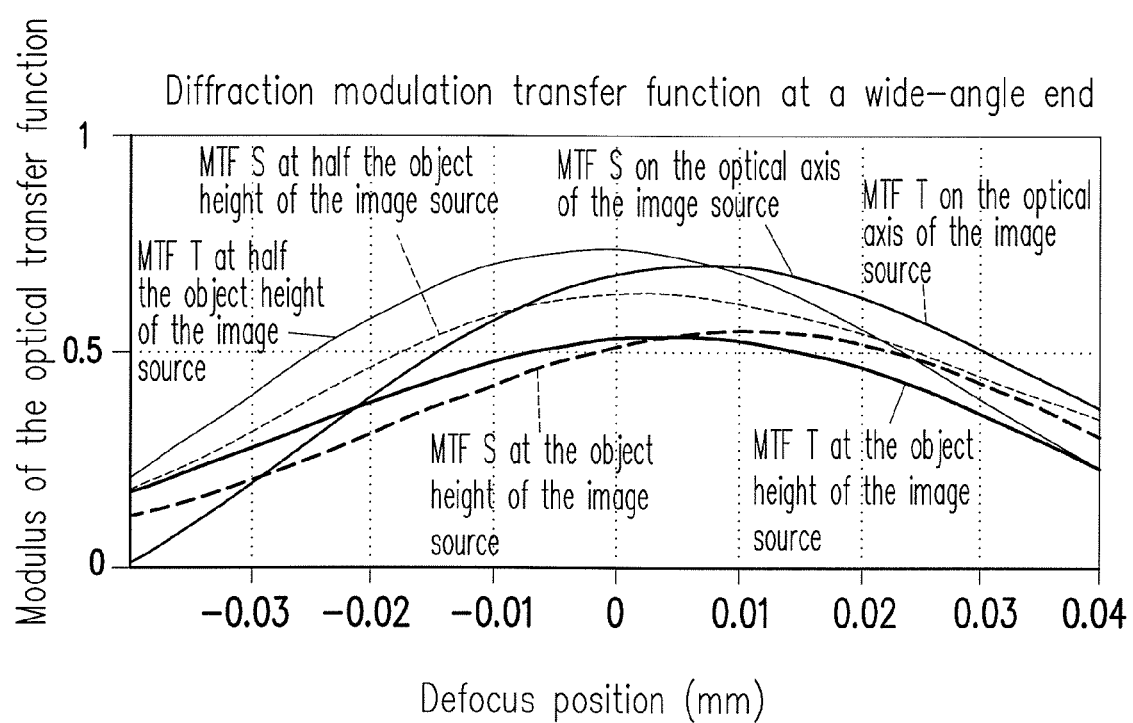
FIG. 2A and FIG. 2B are curve diagrams illustrating diffraction modulation transfer functions while the zoom lens depicted in FIG. 1A and FIG. 1B are located at the wide-angle end and the telephoto end.
Figure 2B:
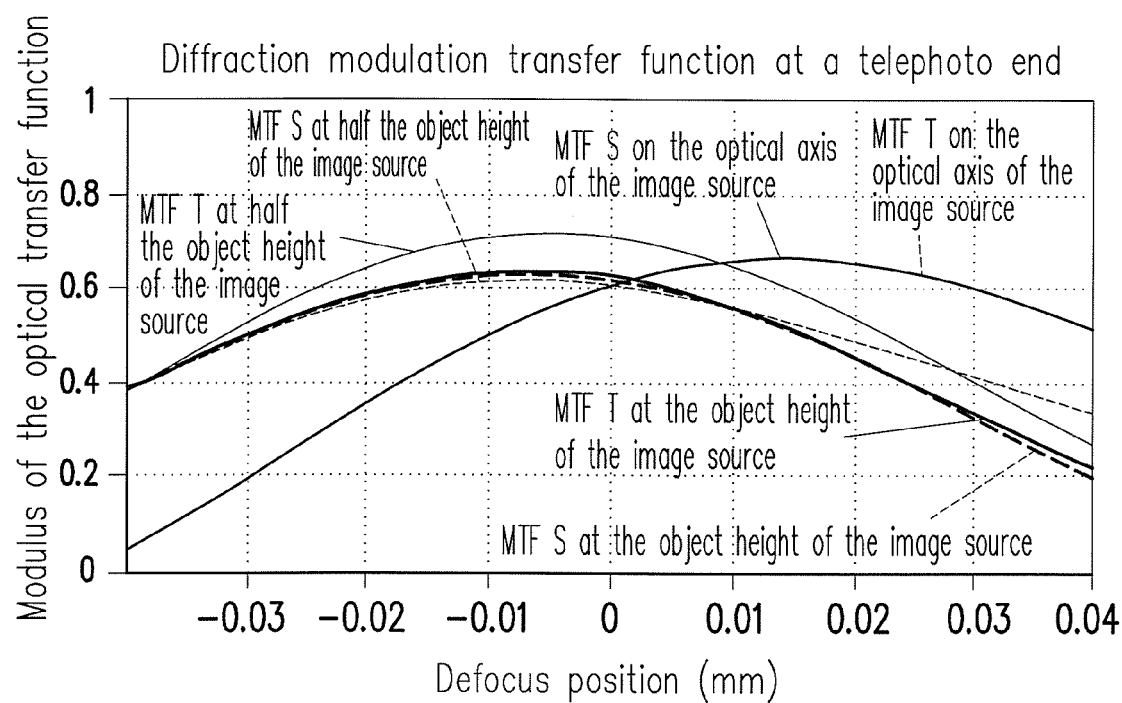
Figure 3A:
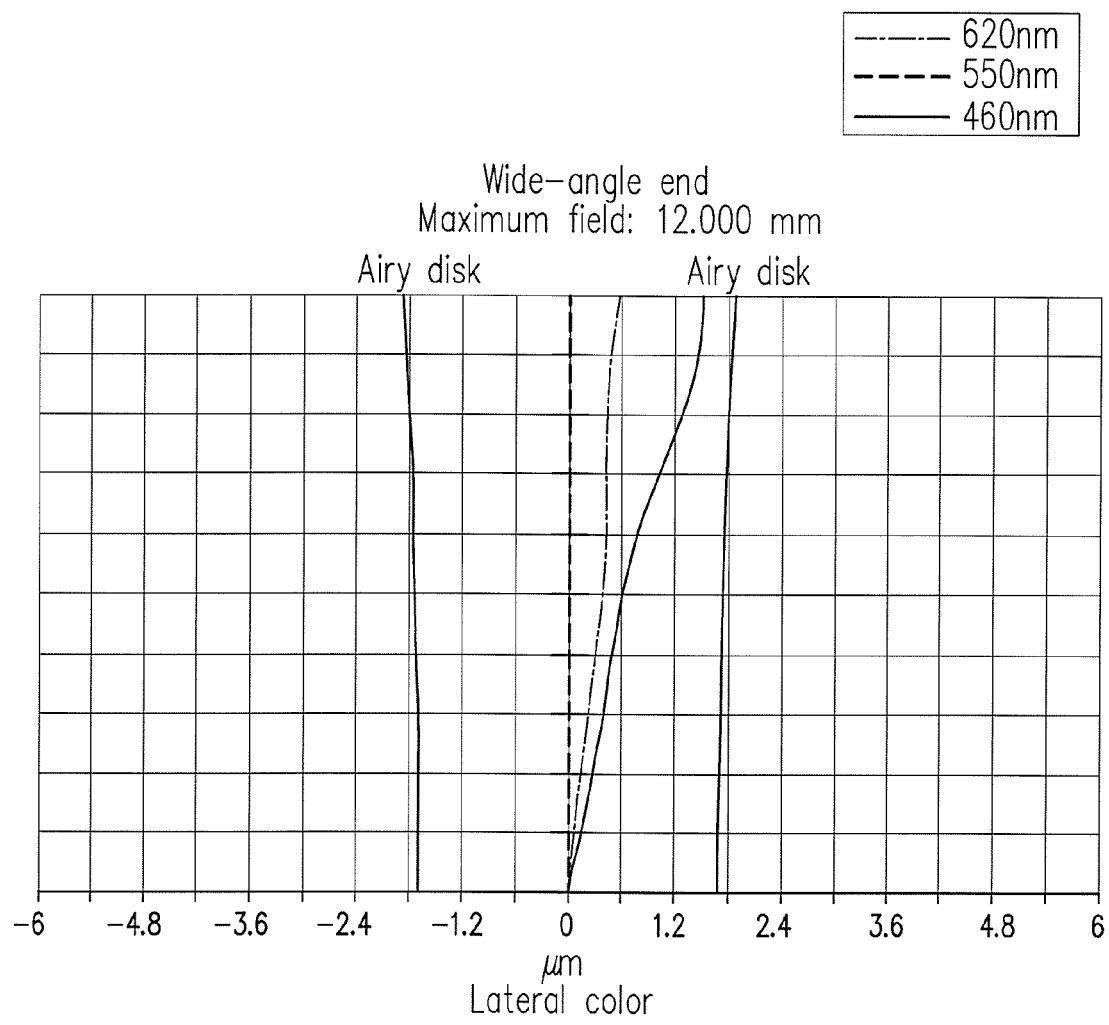
FIG. 3A and FIG. 3B are diagrams illustrating lateral color while the zoom lens depicted in FIG. 1A and FIG. 1B are located at the wide-angle end and the telephoto end.
Figure 3B:
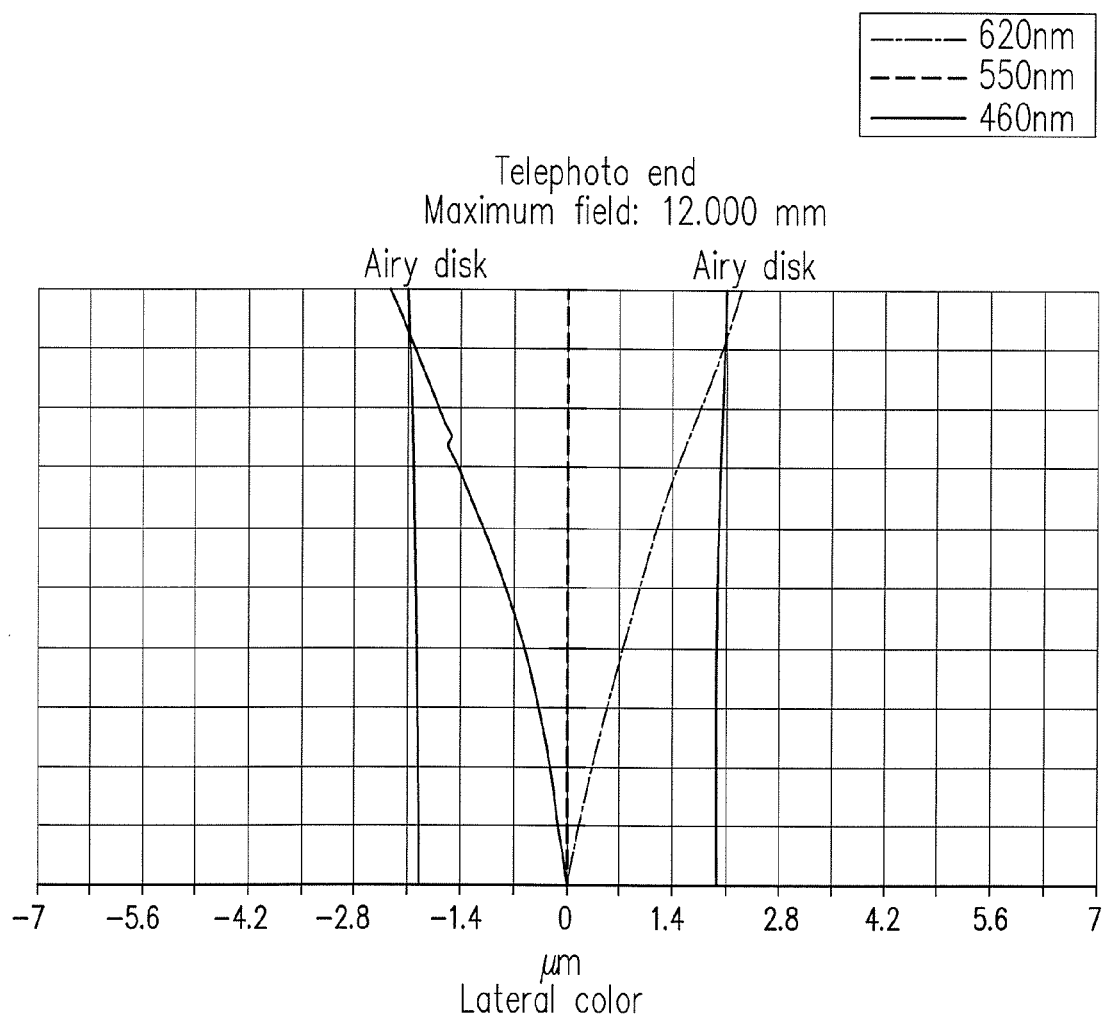
Figure 4B:
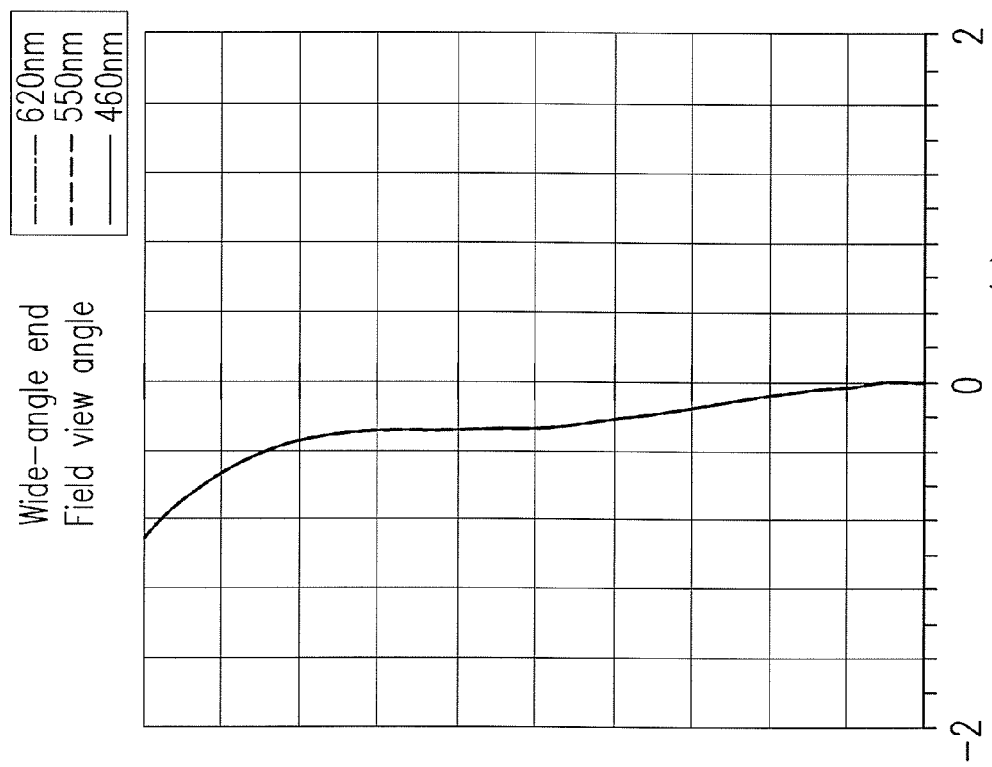
FIG. 4B and FIG. 4D are diagrams illustrating distortions while the zoom lens depicted in FIG. 1A and FIG. 1B are located at the wide-angle end and the telephoto end.
Figure 4A:
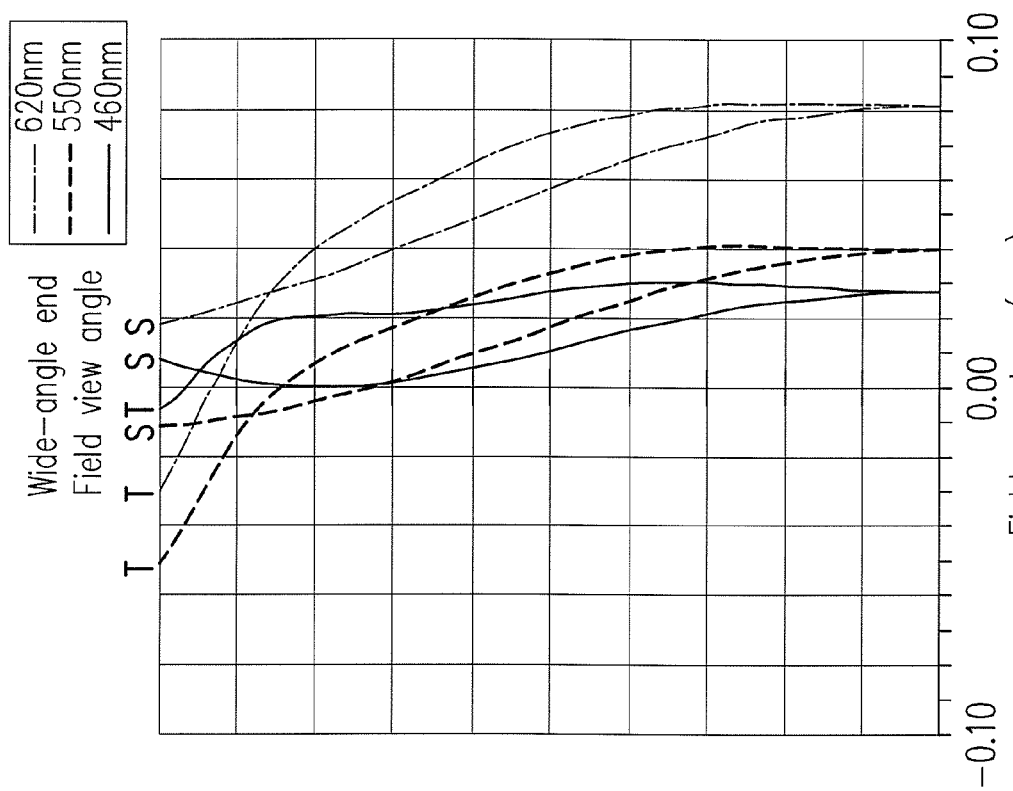
FIG. 4A and FIG. 4C are diagrams illustrating field curvatures while the zoom lens depicted in FIG. 1A and FIG. 1B are located at the wide-angle end and the telephoto end.
Figure 4D:
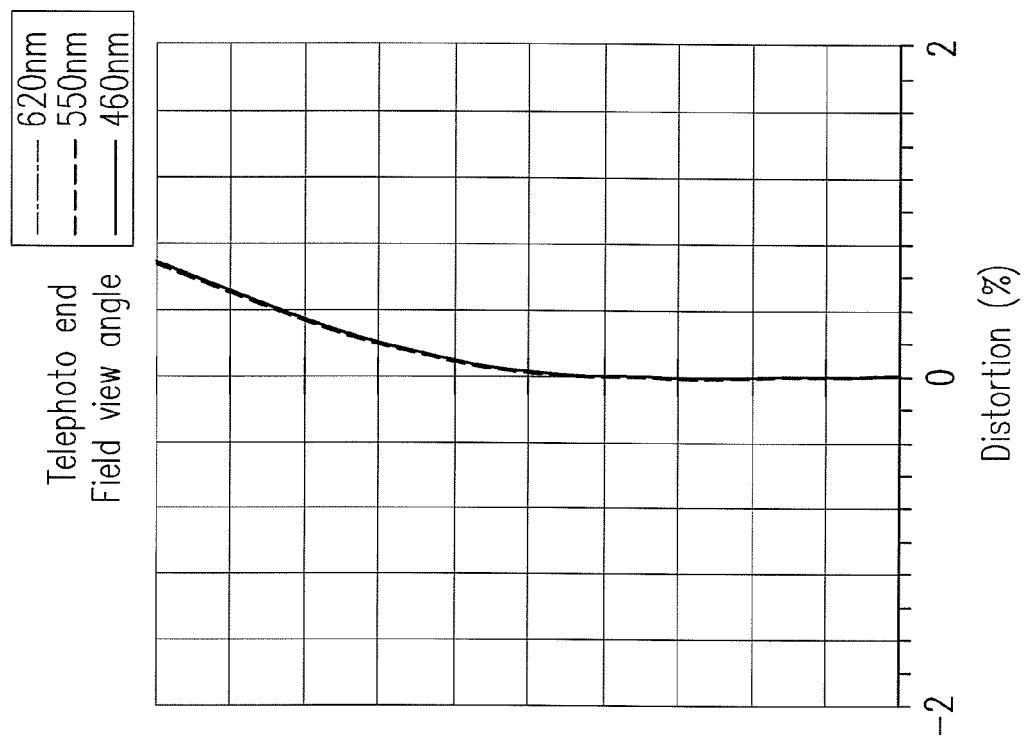
Figure 4C:
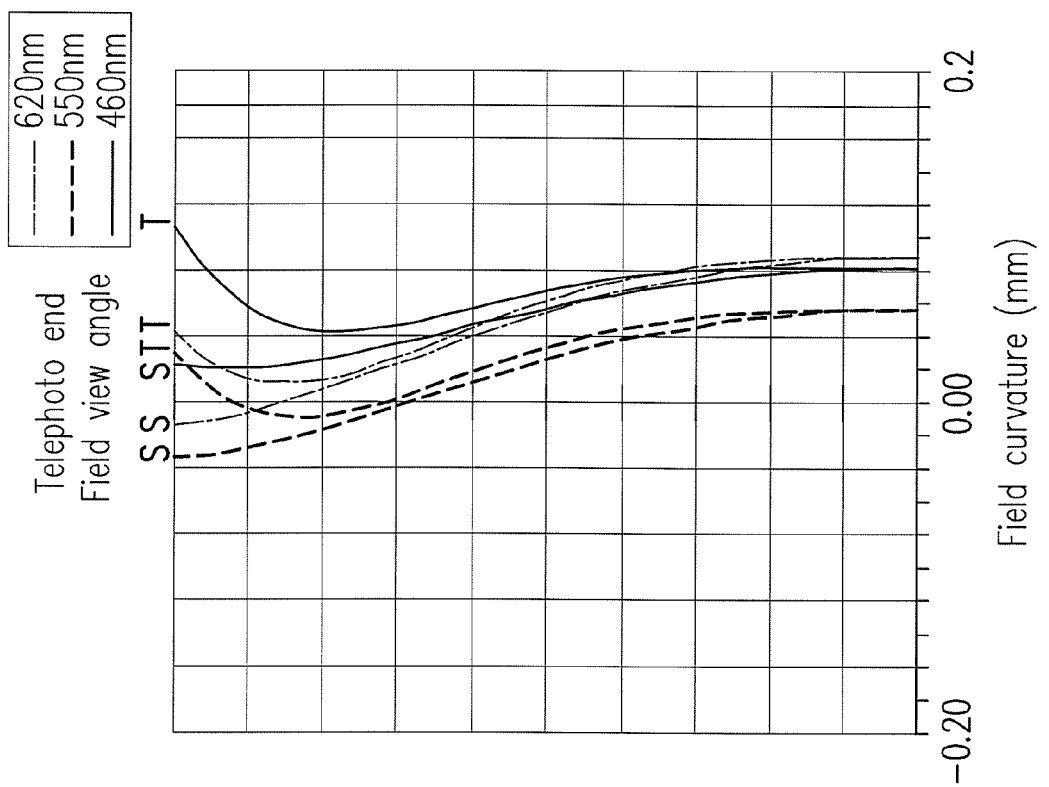
Figure 5A:
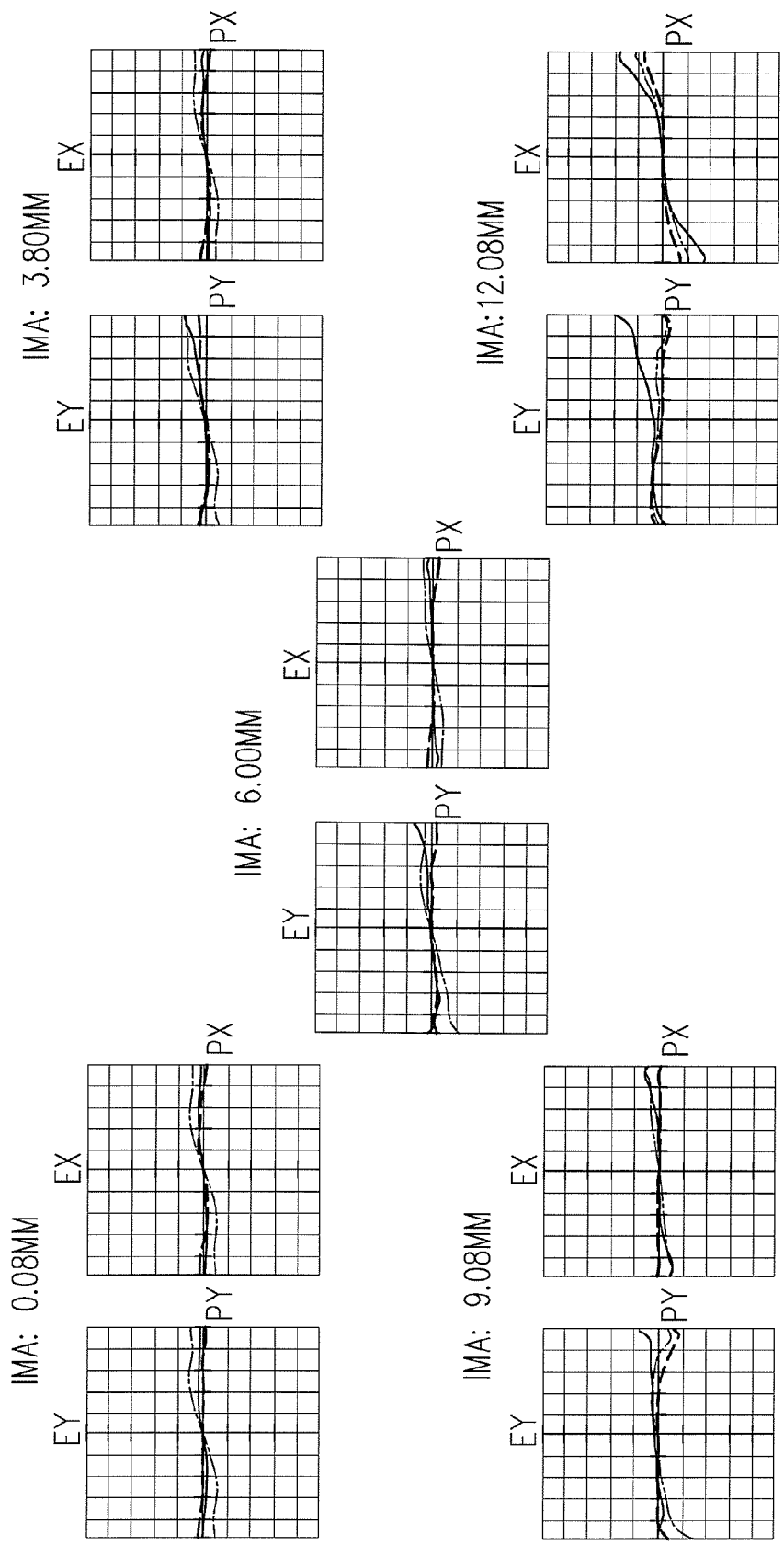
FIG. 5A and FIG. 5B are diagrams illustrating transverse ray fan plots while the zoom lens depicted in FIG. 1A and FIG. 1B are located at the wide-angle end and the telephoto end.
Figure 5B:
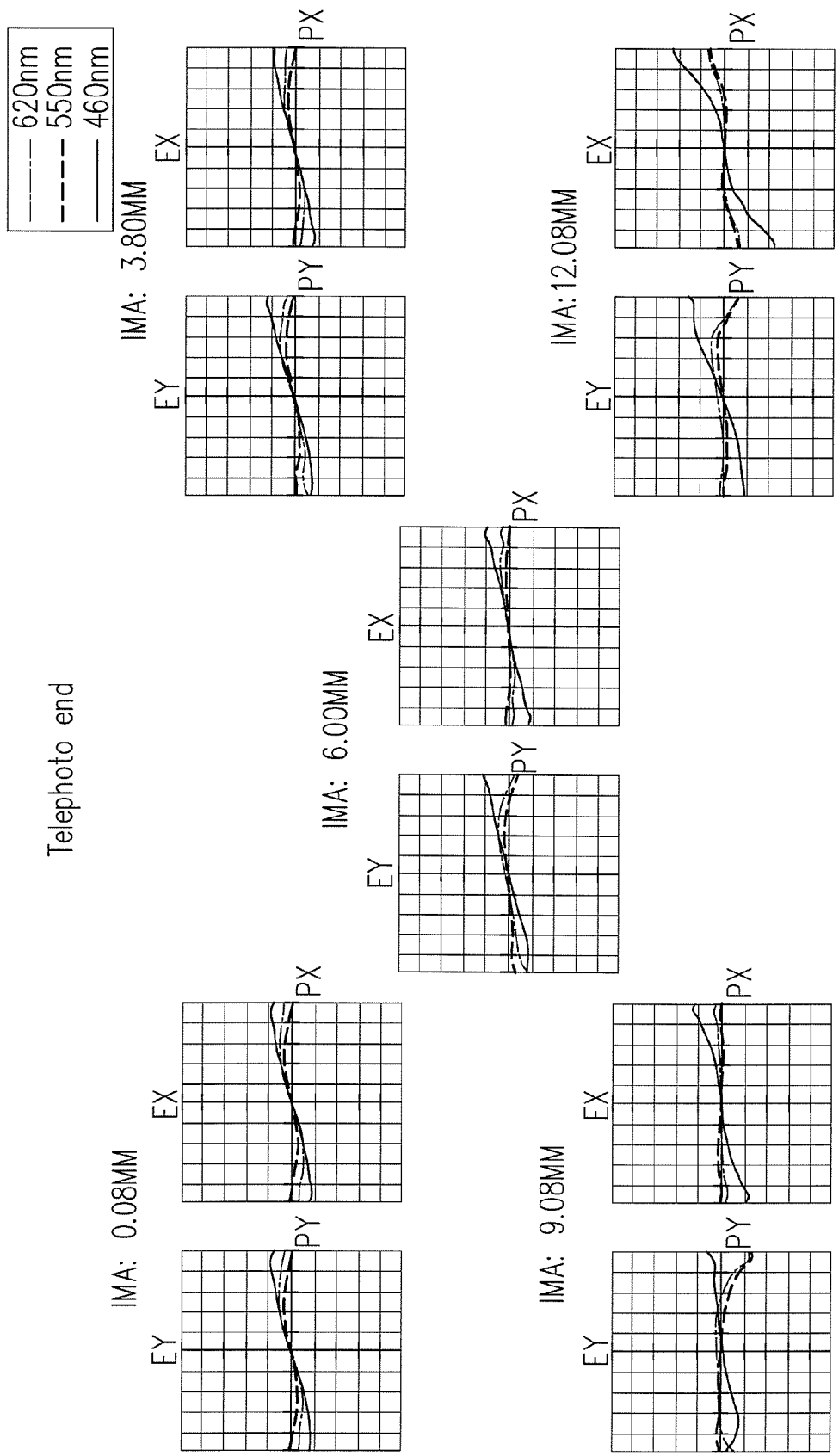

FIG. 2A and FIG. 2B are curve diagrams illustrating diffraction modulation transfer functions while the zoom lens depicted in FIG. 1A and FIG. 1B are located at the wide-angle end and the telephoto end. FIG. 3A and FIG. 3B are diagrams illustrating lateral color while the zoom lens depicted in FIG 1A and FIG. 1B are located at the wide-angle end and the telephoto end. FIG. 4A and FIG. 4C are diagrams illustrating field curvatures while the zoom lens depicted in FIG. 1A and FIG. 1B are located at the wide-angle end and the telephoto end. FIG. 4B and FIG. 4D are diagrams illustrating distortions while the zoom lens depicted in FIG. 1A and FIG. 1B are located at the wide-angle end and the telephoto end. FIG. 5A and FIG. 5B are diagrams illustrating transverse ray fan plots while the zoom lens depicted in FIG. 1A and FIG. 1B are located at the wide-angle end and the telephoto end. Here, FIG. 3A-FIG. 5B are simulated with a light having the wavelength 620 nm, 550 nm, and 460 nm. Those illustrated in FIG. 2A to FIG. 5B all within a standard range, thereby validating the substantially good optical imaging quality of the zoom lens 100 according to the embodiment in the circumstance of the zoom lens 100 having the small volume (e.g., the size(s) of the lens(es) is(are) small).

To sum up, the zoom lens described in the embodiments of the invention may have at least one of the following advantages. In the zoom lens of the embodiment, the refractive powers of the first lens, the second lens, and the third lens are sequentially negative, negative, and positive, respectively; the refractive powers of the fourth lens, the fifth lens, the sixth lens, the seventh lens, the eighth lens, the ninth lens, and the tenth lens are sequentially positive, negative, positive, negative, positive, negative, and positive, respectively; the first lens and the tenth lens are aspheric lenses, and the second lens to the ninth lens are spherical lenses. As a result, the zoom lens characterized by low manufacturing costs and the simple structure is able to achieve favorable/good optical imaging quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A zoom lens, comprising:
    a first lens group, having a negative refractive power and comprising a first lens, a second lens, and a third lens arranged in sequence from a magnified side to a minified side, wherein refractive powers of the first lens, the second lens, and the third lens are respectively negative, negative, and positive; and
    a second lens group, having a positive refractive power, disposed between the first lens group and the minified side, and comprising a fourth lens, a fifth lens, a sixth lens, a seventh lens, an eighth lens, a ninth lens, and a tenth lens arranged in sequence from the magnified side to the minified side, wherein refractive powers of the fourth lens, the fifth lens, the sixth lens, the seventh lens, the eighth lens, the ninth lens, and the tenth lens are respectively positive, negative, positive, negative, positive, negative, and positive, the first lens and the tenth lens are aspheric lenses, and the second lens to the ninth lens are spherical lenses.

2. The zoom lens of claim 1, wherein the zoom lens satisfies 5.1<dw/dt<5.8, dw represents a distance between the first lens group and the second lens group when the zoom lens is located at a wide-angle end, and dt represents a distance between the first lens group and the second lens group when the zoom lens is located at a telephoto end.

3. The zoom lens of claim 1, wherein the zoom lens satisfies 0.8<|f2/f1|<1, f1 represents an effective focal length of the first lens group, and f2 represents an effective focal length of the second lens group.

4. The zoom lens of claim 1, wherein the second lens group further comprises an aperture stop disposed between the ninth lens and the tenth lens.

5. The zoom lens of claim 1, wherein the first lens is a convex-concave lens with a convex surface facing the magnified side, the second lens is a biconcave lens, and the third lens is a concave-convex lens with a convex surface facing the magnified side.

6. The zoom lens of claim 1, wherein the fourth lens is a biconvex lens, the fifth lens is a convex-concave lens with a convex surface facing the minified side, the sixth lens is a concave-convex lens with a convex surface facing the magnified side, the seventh lens is a convex-concave lens with a convex surface facing the magnified side, the eighth lens is a biconvex lens, the ninth lens is a biconcave lens, and the tenth lens is a concave-convex lens with a convex surface facing the minified side.

7. The zoom lens of claim 1, wherein the fourth lens and the fifth lens form a double cemented lens.

8. The zoom lens of claim 1, wherein the seventh lens, the eighth lens, and the ninth lens form a triple cemented lens.

9. The zoom lens of claim 1, wherein the second lens group is a zooming group, and the first lens group is a focusing group.

10. The zoom lens of claim 9, wherein when the zoom lens is zoomed, the first lens group is moved with movement of the second lens group to achieve true zoom.

11. The zoom lens of claim 1, wherein the zoom lens satisfies 0.226<D1/TT<0.256, D1 represents a diameter of a clear aperture of the first lens, and TT represents a total track of the zoom lens.

12. The zoom lens of claim 1, wherein the zoom lens satisfies 0.237<D10/D1<0.258, D1 represents a diameter of a clear aperture of the first lens, and D10 represents a diameter of a clear aperture of the tenth lens.

* * * * *